(12) United States Patent
Fuisz

(10) Patent No.: US 7,437,422 B2
(45) Date of Patent: *Oct. 14, 2008

(54) METHOD AND APPARATUS FOR BOUNCING ELECTRONIC MESSAGES

(75) Inventor: Richard C. Fuisz, Chantilly, VA (US)

(73) Assignee: Meyer Cordless LLC, Las Vegas, NV (US)

(*) Notice: Subject to any disclaimer, the term of this patent is extended or adjusted under 35 U.S.C. 154(b) by 74 days.

This patent is subject to a terminal disclaimer.

(21) Appl. No.: 11/515,481

(22) Filed: Aug. 31, 2006

(65) Prior Publication Data

US 2007/0005718 A1   Jan. 4, 2007

Related U.S. Application Data

(63) Continuation of application No. 10/641,110, filed on Aug. 15, 2003, now Pat. No. 7,188,144, which is a continuation of application No. 10/112,762, filed on Apr. 2, 2002, now Pat. No. 6,643,688, which is a continuation of application No. 09/158,075, filed on Sep. 22, 1998, now Pat. No. 6,389,455.

(51) Int. Cl.
*G06F 13/00* (2006.01)

(52) U.S. Cl. ............... 709/206; 709/219; 709/223

(58) Field of Classification Search .......... 709/206, 709/217, 219, 223; 719/328, 329
See application file for complete search history.

(56) References Cited

U.S. PATENT DOCUMENTS

| | | | |
|---|---|---|---|
| 5,436,960 A | 7/1995 | Campana, Jr. et al. | 455/412.1 |
| 5,438,611 A | 8/1995 | Campana, Jr. et al. | 455/412.1 |
| 5,479,408 A | 12/1995 | Will | 370/313 |
| 5,479,472 A | 12/1995 | Campana, Jr. et al. | 455/412.1 |
| 5,530,861 A | 6/1996 | Diamant et al. | 705/8 |
| 5,551,033 A | 8/1996 | Foster et al. | 713/100 |
| 5,588,009 A | 12/1996 | Will | 714/749 |
| 5,625,670 A | 4/1997 | Campana, Jr. et al. | 455/412.1 |
| 5,689,550 A | 11/1997 | Garson et al. | 379/88.18 |
| 5,740,231 A | 4/1998 | Cohn et al. | 379/88.22 |
| 5,742,905 A | 4/1998 | Pepe et al. | 455/461 |
| 5,764,639 A | 6/1998 | Staples et al. | 370/401 |
| 5,764,899 A | 6/1998 | Eggleston et al. | 709/203 |
| 5,765,004 A | 6/1998 | Foster et al. | 713/323 |
| 5,771,353 A | 6/1998 | Eggleston et al. | 709/227 |
| 5,822,526 A | 10/1998 | Waskeiwicz | 709/206 |
| 5,864,684 A | 1/1999 | Nielsen | 709/206 |
| 5,937,161 A | 8/1999 | Mulligan et al. | 709/206 |
| 5,974,449 A | 10/1999 | Chang et al. | 709/206 |
| 5,987,508 A | 11/1999 | Agraharam et al. | 709/217 |
| 5,995,597 A | 11/1999 | Woltz et al. | 379/93.24 |
| 6,014,429 A | 1/2000 | LaPorta et al. | 379/88.15 |
| 6,031,895 A | 2/2000 | Cohn et al. | 379/88.13 |

(Continued)

OTHER PUBLICATIONS

"*NTP, Inc.* v. *Research in Motion, Ltd.*, Trial Transcript day 6," Nov. 12, 2002, 2-51 and 955-1149.

*Primary Examiner*—Viet Vu
(74) *Attorney, Agent, or Firm*—Woodcock Washburn LLP

(57) ABSTRACT

A method and apparatus is provided that establishes user accounts that automatically forward a user's e-mail to the user's pre-selected forwarding e-mail address(es). Each user creates a forwarding directory, which may comprise multiple e-mail accounts, that the user activates and deactivates as needed.

48 Claims, 5 Drawing Sheets

U.S. PATENT DOCUMENTS

| | | | |
|---|---|---|---|
| 6,064,990 A | 5/2000 | Goldsmith | 705/75 |
| 6,161,129 A | 12/2000 | Rochkind | 709/206 |
| 6,219,694 B1 | 4/2001 | Lazaridis et al. | 709/206 |
| 6,233,318 B1 | 5/2001 | Picard et al. | 379/88.17 |
| 6,285,777 B2 | 9/2001 | Kanevsky et al. | 382/101 |
| 6,327,610 B2 | 12/2001 | Uchida et al. | 709/206 |
| 6,405,243 B1 | 6/2002 | Nielsen | 709/206 |
| 6,549,612 B2 | 4/2003 | Gifford et al. | 379/67.1 |
| 6,633,630 B1 | 10/2003 | Owens et al. | 379/93.24 |

| Sender's email | Conversion email | Time | Date |
|---|---|---|---|
|  |  |  |  |
|  |  |  |  |
|  |  |  |  |

FIG. 4

METHOD AND APPARATUS FOR BOUNCING ELECTRONIC MESSAGES

CROSS REFERENCE TO RELATED APPLICATIONS

This application is a Continuation of U.S. patent application Ser. No. 10/641,110 filed Aug. 15, 2003, now U.S. Pat. No. 7,188,144 issued Mar. 6, 2007, which is a Continuation of U.S. patent application Ser. No. 10/112,762 filed Apr. 2, 2002, now U.S. Pat. No. 6,643,688 issued Nov. 4, 2003, which is a Continuation of U.S. patent application Ser. No. 09/158,075 filed Sep. 22, 1998, now U.S. Pat. No. 6,389,455 issued May 14, 2002.

BACKGROUND OF THE INVENTION

The surge in popularity of the internet has spawned numerous internet access providers. These internet access providers, such as American Online™ or ATT™, provide users with access to e-mail. E-mail may be sent and received from other users on the internet.

E-mail addresses have become popular of both business and personal use. Often recipients will have more than one e-mail address, sometimes with different internet access providers. Virtually every student or business person requires an e-mail address as it is becoming a common mode of communication.

Numerous factors have limited the growth and general usability of e-mail. First, e-mail account information often changes. Whether a user is a student in high school or in college with limited access to the internet, a business person or any other e-mail user, chances are that their e-mail address have changed at some point in time, in conjunction with a graduation from school, changed jobs, etc.

Another aggravating factor is that the life span of the average computer is growing shorter. Many new computers come preinstalled with internet access software. Users often find it difficult to install new software and end up changing their e-mail account. Disconnecting one e-mail account and starting a new one has the unfortunate, and previously unavoidable, consequence of shutting down the old e-mail address and never receiving any e-mail sent to it after it is discontinued.

In addition, new technologies, such as digital phones and pagers, that have the ability to receive text messages, are not capable of being connected to existing internet e-mail accounts.

The present invention solves these and other problems by providing a universal e-mail system that is operable with all types of e-mail software and access service providers. A method and apparatus is disclosed that gives every subscriber a single e-mail address that is linked to other e-mail accounts or services. The present invention is not primarily directed to reading e-mail, rather the focus of the present invention is on the bouncing of e-mail to pre-determined user identified accounts. If a user switches internet providers, from Erols™ to American Online™ for example, there is no need to change the user's bounce e-mail address. In this case, the user simply changes the destination of their bounced e-mail messages. Messages received by the bounce account simply get re-routed to the new e-mail account.

SUMMARY OF THE INVENTION

The present invention solves these problems through the use of an e-mail and internet web site, called DotBounc™.

The bounce system is not an internet provider, rather it is an internet bouncer; a key chain (routing hub) for the digital community. The bounce system establishes user accounts that automatically forward the user's e-mail to the user's pre-selected forwarding e-mail address(es). Each user creates a forwarding directory, which may comprise multiple e-mail accounts, that the user activates and deactivates as needed. The result is that a sender who sends e-mail to the bounce system knows only the recipient's identity and not his ultimate e-mail address(es). If the user changes his e-mail address, his messages are forwarded to his new account. If the user goes on vacation, their e-mail can be forwarded to an associate or to a home account. The bounce system permits Internet e-mail interoperability. All user's can have one e-mail account that serves as a routing hub. They never have to change business cards or miss an e-mail because of a closed account. Internet service providers can come and go, e-mail software can be changed, but the bounce system ensures that e-mail will continue to find its intended recipient.

The bounce system's core routing function can be complemented with vertical services. Filters can be used to sort incoming e-mail; different filters may be applied to different e-mail accounts (e.g. a user may wish to receive a more limited range of e-mail on his cellular phone e-mail account than to his work-related e-mail account). Storage services can be offered to keep records of both incoming and outgoing e-mails. Additional vertical services may include e-mail encryption, return receipt applications, etc.

Users will offer their primary account (their bounce address) as their outside e-mail address. At the bounce hub, users can designate and update existing routing instructions to one or more secondary accounts (pre-selected forwarding accounts). Such routing instructions may include temporary routing instructions (e.g. to an inflight e-mail address etc.). Automated tie-ins with providers of peripheral e-mail services (e.g. in-flight e-mail) will simplify the routing instructions that users must provide (e.g. merely a flight number for in-flight e-mail etc.).

Where a User sends an e-mail from a secondary account (e.g. corporate intranet account etc), the possibility exists that the recipient will respond utilizing the "reply" command. To ensure that such "replies" are routed through the bounce system, users may address outgoing e-mail to a special forwarding address and embed the ultimate-address in a non-address portion of the e-mail (e.g. the re: line, to line, from line, cc line, bcc line, etc.). Upon receipt of the e-mail the bounce system (i) identifies and strips the embedded address from the e-mail and (ii) identifies the primary account of the user. The bounce system then forwards the e-mail content to the ultimate addressee, in the form of an e-mail from the user's primary account. If the recipient chooses to "reply" to this e-mail, such response will be routed through the bounce system.

The bounce systems central routing function can be complemented with the addition of numerous vertical services. It is expressly contemplated that forwarding addresses can be corporate accounts in hotels or on planes. In addition, the bounce system can strip pre-determined information out of one or more e-mails, compile that information if requested to, and forward the information to a non-internet account, such as a pager, digital phone, cellular phone, satellite phone, pager, fax, voicemail, or the like.

E-mail routed through the bounce system may be sent through e-mail filters. Users may select different filters for different secondary accounts. For example, a user may wish to receive only a highly-selective percentage of e-mails to his cellular phone. A user with an Iridium" phone may wish "from" and "re:" line information be forwarded to his phone as a page and full text email be held temporary for forwarding as a text message if the user wants to read the message.

Storage services may be provided to users wishing to maintain a record of incoming and outgoing e-mails.

In addition to designated conventional e-mail addresses, the bounce system provides optional tie-in's to new e-mail services which do not have fixed addresses for each new user. For example, a user who is a frequent flier on a particular airline may wish to receive airborne e-mails care of the airborne e-mail service provider. Such airborne email service provider notifies the bounce system of the presence of a particular User and inform the bounce system of the applicable routing address and duration of the validity of such routing address. Unopened e-mails at such location are automatically deleted at the conclusion of the User's presence. Similar tie-ins can be established with hotels. The hotel informs the bounce system that a user has checked in and provides the bounce system with the e-mail address associated with the user's room. For the duration of the user's stay, the user's incoming e-mail is routed to that address (e.g. to an e-mail application accessible form the hotel room's television, etc.). Unopened emails are automatically deleted at the user's checkout. Similar "Floating" tie-ins can be established in connection with users' travel on ships, use of rental cars, etc. In connection with the use of such "Floating" secondary accounts, the bounce system can offer an incoming e-mail memory cache to maximize users' ability to review incoming e-mail while in transit. For example, a user traveling from LA to NY on the red-eye flight may be out e-mail of contact from the time he leaves his office in LA until his arrival in his hotel room in New York. Such user could instruct the bounce system to store his emails arriving after 5:00 (LA time) and deliver such stored e-mails to such user's New York hotel room following his 8:00 am (NY time) check-in the following morning.

With these and other objectives, advantages and features of the invention that may become apparent, the nature of the invention may be more clearly understood by reference to the following detailed description of the invention, the appended claims, and to the several drawings attached herein.

BRIEF DESCRIPTION OF THE DRAWINGS

FIG. 4 is a schematic of the conversion database; and

DETAILED DESCRIPTION OF ILLUSTRATIVE EMBODIMENTS

A detailed description of the invention and of the preferred embodiment is set forth below. Those of ordinary skill in the art will recognize that it is expressly contemplated that the invention may comprises all or portions of the functions described herein and may be modified accordingly.

A. General Description

Figure 1:
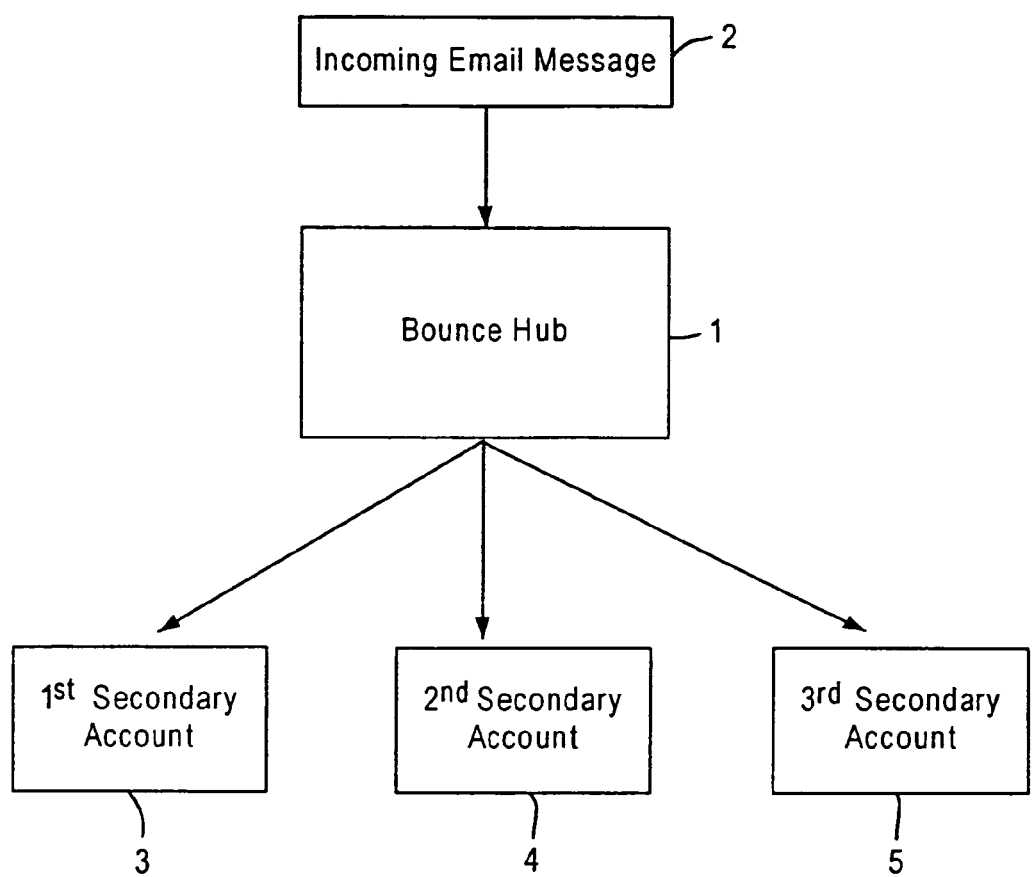
FIG. 1 is a schematic of the bounce system.

FIG. 1 shows a the bounce system, a user-activated routing hub 1 for electronic mail ("e-mail") sent from a sender 2. The bounce system customers ("Users") will have e-mail accounts located at the bounce system ("Primary Accounts"). Through a user interface, Users can designate routing instructions for their incoming e-mail, including routing to multiple e-mail addresses ("Secondary Accounts") 3, 4 and 5. This routing ability permits Users to leverage multiple e-mail accounts, including accounts associated with new e-mail peripherals (e.g. cellular phones, handheld computers etc.) and other e-mail services (e.g. onboard aircraft or boat services, in-hotel e-mail services, automobile services etc.). Additionally, Users are able to use their Primary Accounts as their permanent e-mail addresses, while retaining the flexibility to change their Secondary Accounts (e.g. in connection with changes in occupation-related e-mail address, a switch to a new e-mail provider, the use of new e-mail peripherals etc.).

Figure 2:
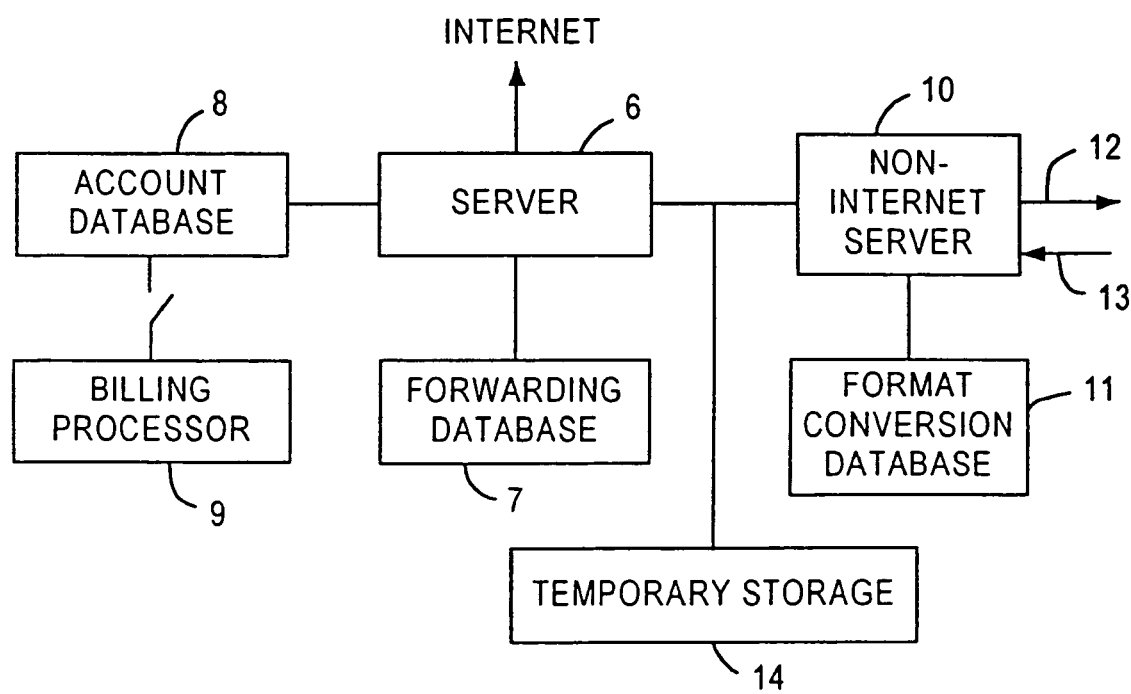
FIG. 2 is a block diagram of one example of a bounce apparatus.
Figure 3:
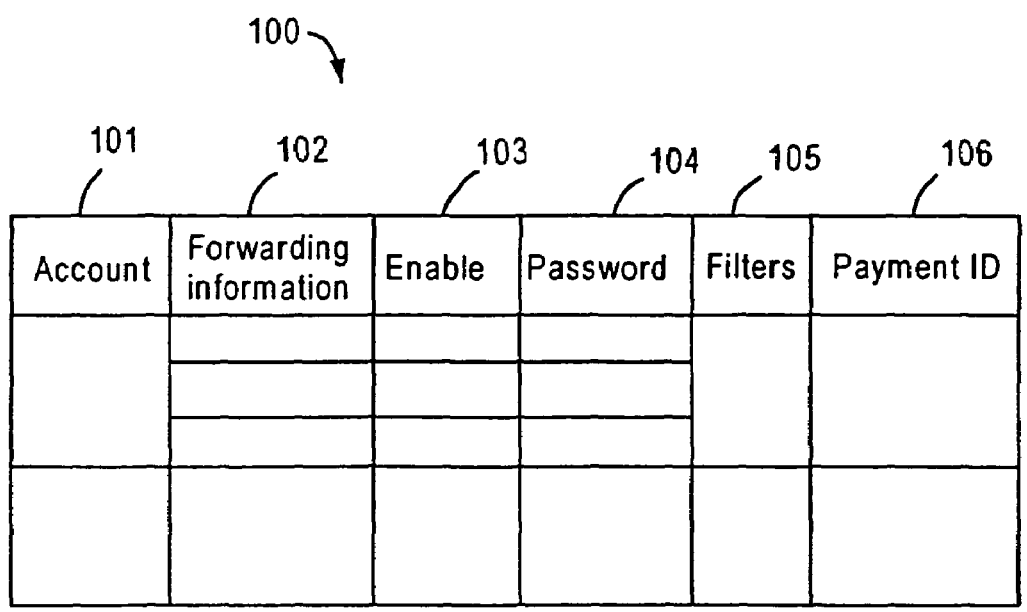
FIG. 3 is a schematic of the forwarding database.
Figure 3A:
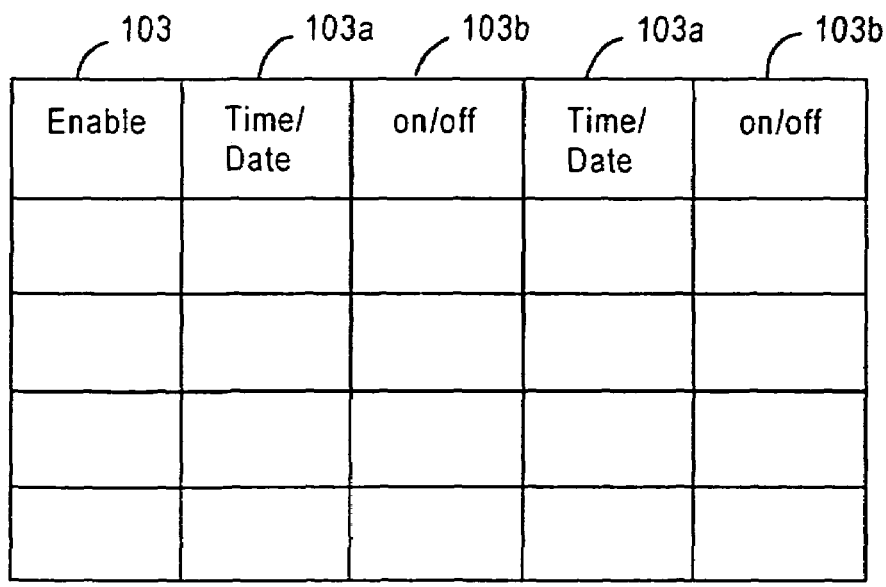
FIG. 3A is a schematic of the enable function database.
Figure 5:
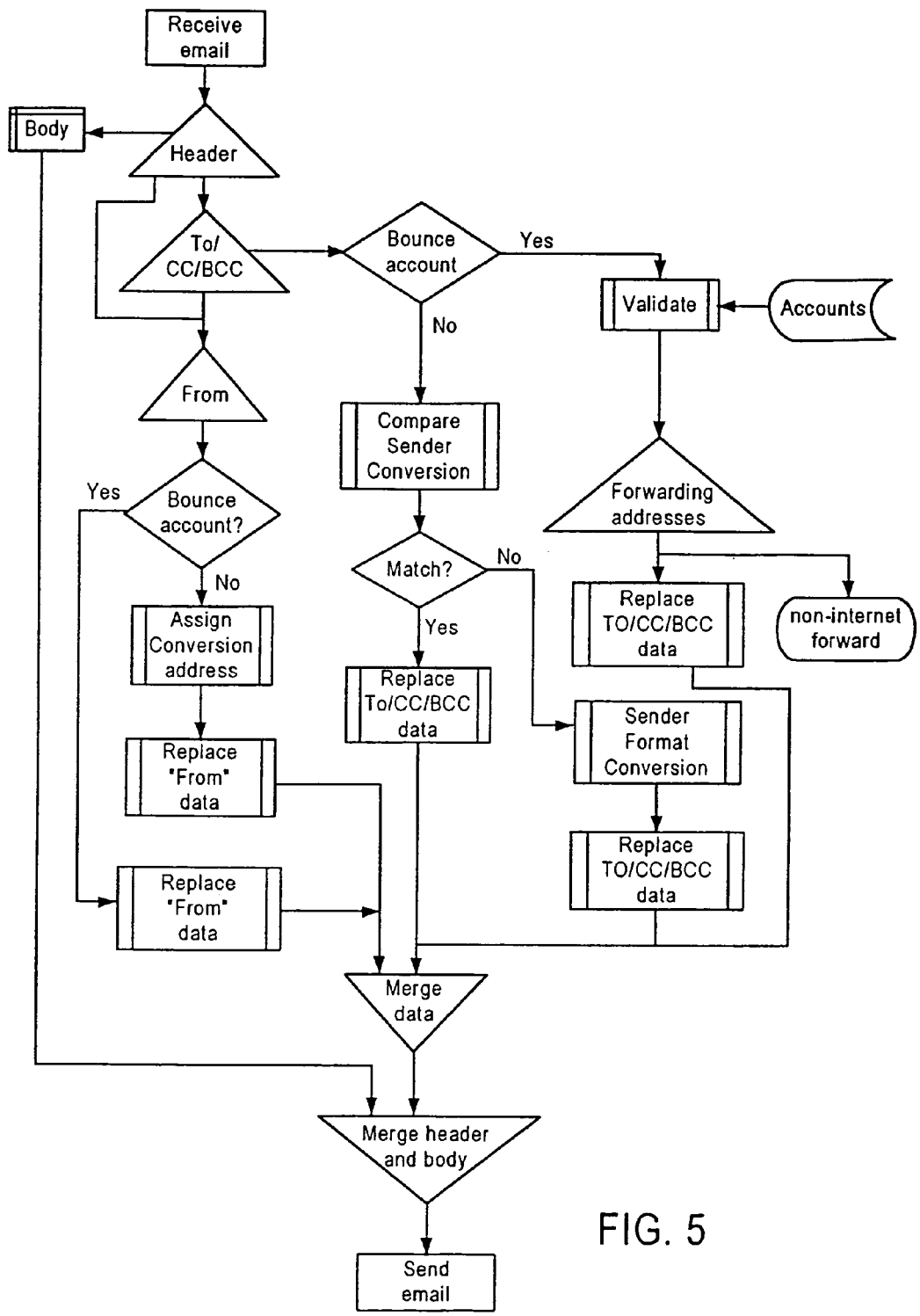
FIG. 5 is a logic diagram of one embodiment of the bounce method.

One embodiment of a bounce system connected to the internet as a stand alone system is shown in FIG. 2. A server 6 is connected to the internet through a standard high speed internet connection, such as a T1 line. The server 6 is connected to a forwarding database 7, an account database 8, a non-Internet bounce processor 10 and temporary storage 14. Although the databases have been shown as separate elements, they may be combined or separated in any manner. Standard industry disk drives may be used for the databases, such as ROM, optical discs, writable CD ROM, or any other conventional storage or mass storage device. Any conventional internet server and operating system may be used with the present invention.

The server's 6 main function is to receive an e-mail, identify the type of message, whether it is coming from a non-bounce account to a bounce account, coming from a bounce account to another bounce account or conning from a bounce account to a nonbounce account. The server 6 identifies the type of message, obtains any necessary forwarding information and processes the message accordingly. The server does not need to access the message itself and preferably operates based on the "to" and "from" address lines. It is expressly contemplated that the bounce system can be made to operate on "cc," "bcc," "re:," null lines, the message body or any other portion of the e-mail that may contain, or have embedded, routing information.

In addition, a non-internet bounce processor 10 may be provided. A format conversion storage unit 11 is connected to processor 10 and maintains the conversion instructions that are to be applied to non-internet bounced e-mail messages. The processor 10 will be discussed below in detail.

B. Forwarding Database

The present invention works through the use of its forwarding database 7. A forwarding database 100 is constructed that correlates account information 101, forwarding information 102, enabling function 103, password protection 104, filters 105 and payment information 106.

The forwarding database is designed to be modifies using an interactive web page or, through a telephone access system or via e-mail. User's can enter new forwarding information 102 or change stored forwarding information through the enabling function 103. Those of ordinary skill in the art will appreciate that the bounce database may be modified to contain all or some of these categories. It is contemplated that the database 100 will have an account identifier category 101 and a forwarding address category 102.

The enabling function 103 permits a User to enter dates 103*a* and times 103*b* that govern when a forwarding e-mail address is turned on or off.

C. Forwarding E-Mail Messages and Replies

It is contemplated that there are three basic types of e-mail messages that will be processed by the bounce server 6. As the bounce process is designed to work with any existing e-mail software, such that someone using Microsoft's e-mail software can bounce a message to someone using American Ontine or Yahoo, in one embodiment the bounce process is designed to operate off of the "to" and "from" information and not the message contents.

The present invention takes advantage of the RFC 822 message format system in which the data envelope is divided into a header and body. The header is generally set off from the message body by a null line and contains the sending instructions. The header includes more than just "to" and "from" information and is updated by every Mail Transfer Agent (MTA) that the e-mail passes through. The present system is designed to work with all types of e-mail client/servers including, but not limited to, offline 10 models, online models and disconnect models. The present invention is not limited to use with the RFC 822 message format and may be used with any other e-mail protocol or standardized message format.

The main benefit of the bounce system is that it permits e-mails to be forwarded to one or multiple e-mail accounts. The forwarding addresses can be changed depending on the User's need. Thus, if a service provider is changed, the user switches companies or goes on vacation, the forwarding information can be changed accordingly. This permits User's to give people one address that never needs to change.

The bounce process requires that e-mails be routed through the bounce server or a bounce processor. The bounce process has been designed to work by changing the "to" and "from" data contained in the header of the e-mails routed through the server without effecting the underlying e-mail message. The header is identified, in one embodiment based on its separation from the message body by a null line, and the "to" and "from" information extracted. The bounce process can be implemented with a dynamic-link library (DLL) or as a separate process that interfaces with the DLL.

Another advantage of the Bounce process is that it only requires access to the e-mail header and not the body contents. The body can thus be separated from the header and temporarily stored while the re-addressing process is executed. New advances in e-mail messaging that implant data into the message body may continue to be used.

Figure 4:
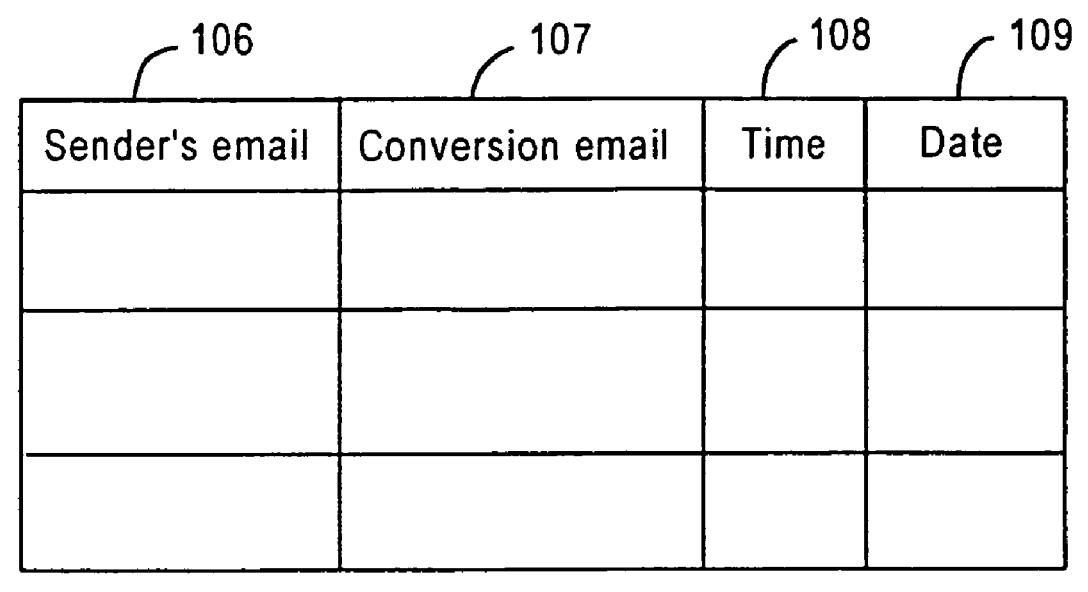

Because the bounce server cannot operate on e-mails that are not routed through the bounce server, a simple and efficient process has been designed to ensure that any User, using any form of e-mail software, can send their e-mails through bounce. Bounced e-mails can be categorized as three basic types, (1) non-bounce to bounce, (2) bounce to bounce and (3) bounce to non-bounce, each of which is described below in detail. FIG. 4 illustrates one embodiment of the bounce process. Those of ordinary skill in the art will recognize that the processes described below may be implemented in whole or in part. In addition, those of ordinary skill in the art will recognize that information other than the "to" and "from" information may be used and different address conversion processes used.

1. From a Non-Bounce Account to a Bounce Account

When a non-bounce user sends a bounce user an e-mail, the server extracts the "to" information from the header and searches the forwarding database to match the e-mail address. Once found, in its simplest form, the message may be forwarded to the forwarding addresses without changing the to and from information. This is referred to as a one way bounce and has the disadvantage that reply e-mails back and forth between the sender and recipient circumvent the bounce server.

Preferably, in addition the "from" data is compared to all e-mail addresses in the forwarding database. If the sender address is attached with or from a bounce account, the "from" data is modified to reflect the sender's address "in care of" the bounce system. This can be accomplished in a number of ways, one of which is to create a new temporary e-mail bounce account, referred to as a conversion address. The sender's email address and conversion e-mail address are stored in 107 and 108. The conversion e-mail address is substituted for the sender's address when the e-mail is forwarded. This permits the bounce user to use their "reply" button and have the reply message rerouted through bounce. Upon receipt by bounce, the conversion or "care of" address is changed into a conventional "to" address and the "from" address is adjusted as discussed in 3 below (from a bounce account to a non-bounce account) and the e-mail is sent by the bounce system for delivery.

The conversion or "care of") address preferably takes on a form that identifies the sender. For example, if Jdoe@DotBounce.com receives a message from Jane@aol.com, Jane's address is converted to Jdoe_Jane_aol_com@DotBounce.com or Jane_aolcom@DotBounce.com or Temp0001@DotBounce.com or any other unique form. Upon receipt, it is obvious that Jane at the ao.com sent the e-mail. A reply will go back through DotBounce.com and be forwarded to the appropriate AOL address. Using the bounce account (jdoe) plus additional user originated identifying information (jane_aol_com) conversion a-mails will not be duplicated. Those of ordinary skill in the art will recognize that other ways of creating non-duplicated sender identifiers may be used, such as a non-repeating numerical identifier.

2. From One Bounce Account to Another Bounce Account

An e-mail from one bounce account address to another is simple to route. The bounce system can be accomplished in at least one of two ways. First, forwarding information can be identified and the e-mail is forwarded without changing the sender's information. This sender's address is unchanged and a reply will go to the sender's address.

This first method is accomplished by matching the sender's e-mail address to a valid bounce address.

The second method matched the sender's address against known bounce address to check if the sender has a bounce e-mail address. If the sender has a bounce e-mail address, the sender's bounce e-mail address is substituted in the e-mail. Thus, the "from" information is replaced with the sender's bounce account.

If a sender uses a non-bounce account to send the e-mail, for example one of his forwarding accounts, the server matches the sender's e-mail address against the forwarding database to determine whether the sender has a bounce account. If a bounce account exists, the sender's address is changed to their bounce account. This permits the recipient to reply and have the reply e-mail go to bounce and be forwarded to all the sender's forwarding addresses.

The bounce account to bounce account highlights one unique feature of the bounce process; it is not an e-mail system per se but an e-mail routing system.

3. From a Bounce Account to a Non-Bounce Account

If a bounce account owner wants to send an e-mail to a non-bounce account, they have several options for ensuring that a sender's reply is routed through bounce. When sending the e-mail, if their software permits, they may identify the sender as their bounce account. This way, when the person receiving the e-mail replies, the e-mail is routed through the bounce server and forwarded accordingly. If however their software does not permit their sender's address to be modified, they may send bounce and e-mail using a recognized bounce conversion format. For example, John Doe, who has a bounce account, wants to send Jane an e-mail, who does not have a bounce account, John sends an e-mail from himself to bounce and embeds Jane's e-mail in the recipient address.

These describe the three basic formats used for bouncing e-mails. The present invention is not limited to these three types and may use one or any combination of these types of bouncing.

D. Secondary Source Bounces

In addition to integrating the e-mail addresses that people have, the present invention also recognizes and solves a growing problem facing the population as a whole. The expense of computers and e-mail messaging hardware has created two disparate groups in society, those with access to e-mail and those without. While many children are exposed to e-mail in school and perhaps have access to a computer at school or at the public library, they do not have a single account of semi-permanent e-mail address. The bounce process above solves many of the problems faced by many. Those using public computers, such as in school or the public library, face the added disadvantage that they can not constantly check their e-mail. Unless, they visit the library daily, an important e-mail message may sit for days if not weeks. Thus, the present invention contemplates the possible addition of non-Internet bounces.

A non-internet bounce is a bounce of all or a portion of an e-mail message to a non-internet source, such as a digital phone, cellular phone, satellite phone, fax, pager, voicemail, etc. A non-internet bounce processor 10 with input 13 and output 12 is provided with a format conversion database 11. The database converts the e-mail messages, perhaps by stripping the "from" data, and forwards it to a pager network. The processor 12 converts the data to a form that is recognized by the non-internet bounce system 10 that is being used (e.g. Iridium™ pages). It is contemplated that any variety of commercially available systems may be used and Like e-mail software, they may be freely chosen by the user.

For people who travel to foreign countries or who don't have access to e-mail they may chose to have their e-mails forwarded to a fax machine. The e-mails and their contents may be faxed using any form of traditional fax software. The bounce system may compile received e-mails and send them in a single transmission or may be programmed to send predetermined parts of the e-mail messages.

Advances is speech technology may also be used to read all, or portions, of an e-mail into a voice-mail account. If the sender knows the e-mail user will play the e-mail into a voice-mail, the user may embed an audio file that will be played by the processor 10 onto the voice-mail system.

Yet another option, particularly suited for those outside of the country is a return voicemail e-mail processor provided in or in conjunction with the processor 10. A voice-mail account can be created by a user that may be accessed by processor 10. The voice-mail messages may be captured in an audio format and appended to a replay e-mail message. This permit a user who does not have access to e-mail to receive and respond to e-mails using a phone. This is particularly advantageous for business travelers who do not know if important messages will be left on their voice-mail or e-mail. Those without the financial resources to own a computer can also use this system to join the business community that is using e-mail with increasing frequency.

E. Vertical Services

Vertical services, value added options, may also be. incorporated into the bounce system. Limited storage may be available for user's who do not have a forwarding address that is presently available. For example, a business traveler may wish to access his e-mails from a foreign country and will not know the e-mail address/account he will use to retrieve the messages. Hence, bounce may offer the ability to store all e-mails arriving after a pre-set time until they are retrieved.

Bounce may also be embedded into intranets or corporate accounts. A corporation may chose to provide all of its user's with bounce accounts such that e-mails directed to a sale representative may also be routed to the regional manager. It is also envisioned that hotels and airlines may use corporate bounce accounts. In a corporate bounce account, the corporation may purchase several bounce accounts, perhaps one corresponding to each room in the hotel. The hotel may assign a bounce account to a particular user. Each corporate account may be tied to the hotel's e-mail system associated with the room (or seat) the guest is ultimately placed in. For example, a hotel may provide a user with an e-mail, guest007@hiphotel.com. The user and the hotel do not know yet what room the guest will be placed in. Upon check in the guest's room number is inserted into bounce as the forwarding address. In-house e-mail networks or voice-mail networks, may then be used to collect any messages that people sent. The hotel may provide bouncing to pagers or digital phones to its guests.

Because bounce receives and sends many different messages, bounce may also be used to filter what messages are sent where or are bounced at all. User's may create there own filters, for example send all messages from Jane@aol.com to Jdoe@aol.com, or user's may opt for bounce filters. Bounce filters can be used to filter out messages that are sent to a wide variety of users, such as solicitations. Because bounce extracts and search each "to" and "from" bounce can identify when one sender is sending a huge amount of messages to multiple users. Bounce may be set to automatically filter out any e-mail message sent to more than 100 bounce accounts. Bounce filters are particularly useful where the receiving account is not suited to receive a high volume of large messages for various reasons.

Bounce may also be sued to obtain statistical information. Because all emails are routed through bounce, the bounce server may be designed to collect accurate information concerning what internet providers are being used, how often e-mail is used, etc.

F. Web Services

It is contemplated that the bounce system will be implemented through a web page, www.DotBounce.com. User's will be able to sign up form bounce using a series of interactive web pages. Once a bounce account is created, user's may modify forwarding accounts, filters, non-internet bounces, all through the interactive web page.

It is contemplated that billing will also be implemented electronically. User's credit card or payment information will be located in a billing processor 9 that is selectively attachable to the account database 8. User's identification and credit card information will be selectively attached to the bounce serve for increased protection from unauthorized access. If the internet and or internet providers adopt a data packet pricing, it is expressly contemplated that the server 6 may incorporate a e-mail data size counter that counts the data size of all forwarded e-mail and bills the user. It is also contemplated that senders may be billed for bounced e-mail.

Although the embodiment above has been described as a stand alone server attached to the internet, it is expressly contemplated that the bounce system may be incorporated in whole or in part to existing internet and intranet accounts.

Those of ordinary skill in the art will recognize the wide commercial applicability of the invention set forth above. Those of ordinary skill in the art will recognize the large commercial use of the apparatus and method herein described to the business and internet community. Those of ordinary skill in the art will recognize that the invention herein described and claimed may be modified and is not limited to the specific embodiments herein described.

The invention claimed is:

1. A computer-readable medium comprising computer-executable instructions for performing the following steps:
   storing, in a database, secondary account information about a secondary account associated with primary account information about a primary account;
   receiving, from the secondary account, an electronic message including both a sender address related to the secondary account and a recipient address, wherein said recipient address is a conversion address which includes an embedded address that is independent of any previously received electronic messages;
   replacing the recipient address with the embedded address to generate a forwarding address; and
   forwarding the electronic message to the forwarding address.

2. The computer-readable medium of claim 1, having further computer-executable instructions for performing the steps of:
   retrieving, from said database, primary account information corresponding to the secondary account, said primary account information including a primary account address;
   replacing the sender address with the primary account address prior to forwarding the electronic message.

3. The computer-readable medium of claim 1, wherein the step of replacing includes the steps of:
   extracting the embedded address form the recipient address, and
   generating the forwarding address based on the extracted address.

4. The computer-readable medium of claim 1, wherein said forwarding address corresponds to an e-mail account and said secondary account is a non-internet account.

5. The computer-readable medium of claim 4 wherein said non-internet account is a pager account.

6. The computer-readable medium of claim 4 wherein said non-internet account is a cellular telephone account.

7. The computer-readable medium of claim 4 wherein said non-internet account is a digital telephone account.

8. The computer-readable medium of claim 4 wherein said non-internet account is a satellite telephone account.

9. The computer-readable medium of claim 4 wherein said non-internet account is a voice-mail account.

10. The computer-readable medium of claim 9, having further computer-executable instructions for performing the steps of:
    capturing a reply message in an audio file; and
    sending said reply message to the secondary account.

11. The computer-readable medium of claim 4 wherein said non-internet account is a facsimile account.

12. The computer-readable medium of claim 1, having further computer-executable instructions for performing the step of:
    determining a packet size of said forwarded electronic message.

13. The computer-readable medium of claim 12, having further computer-executable instructions for performing the step of:
    billing a sender of said electronic message based at least in part on said packet size of said forwarded electronic message.

14. The computer-readable medium of claim 12, having further computer-executable instructions for performing the step of:
    billing a primary account holder based at least in part on said packet size of said forwarded electronic message.

15. A computer-readable medium comprising computer-executable instructions for performing the following steps:
    entering a floating account in a database that corresponds to a primary account, wherein said floating account comprises a user identifier;
    receiving an electronic message addressed to the primary account;
    looking up a secondary account assigned to said floating account;
    replacing the recipient address with said secondary account; and
    receiving a secondary account for said floating account from an associate service provider.

16. The computer-readable medium of claim 15, having further computer-executable instructions for performing the step of:
    entering a start time for said floating account.

17. The computer-readable medium of claim 15, having further computer-executable instructions for performing the step of:
    entering a stop time for said floating account.

18. The computer-readable medium of claim 15, having further computer-executable instructions for performing the step of:
    entering a departure time, wherein one or more electronic message received after the departure time is forwarded to said secondary account.

19. The computer-readable medium of claim 18, having further computer-executable instructions for performing the step of:
    storing one or more electronic message received after said departure time but before activation of said secondary account.

20. The computer-readable medium of claim 15, wherein said secondary account is a non-internet account.

21. A computer-readable medium comprising computer-executable instructions for performing the following steps:
    receiving a floating account request that corresponds to a primary account;
    validating said primary account;
    assigning a floating account to said primary account based on said floating account request, wherein said floating account has a user identifier and is administered by an associate service provider;
    activating said floating account;
    receiving an electronic message addressed to the primary account;
    looking up said floating account assigned to said primary account; and
    replacing the recipient address with said floating account.

22. The computer-readable medium of claim 21 wherein said primary account is a cellular telephone account.

23. The computer-readable medium of claim 21 wherein said primary account is a digital telephone account.

24. The computer-readable medium of claim 21 wherein said primary account is a satellite telephone account.

25. The computer-readable medium of claim 21 wherein said primary account is a voicemail account.

26. The computer-readable medium of claim 21 wherein said primary account is a facsimile account.

27. The computer-readable medium of claim 21 wherein said primary account is a pager account.

28. The computer-readable medium of claim 21, having further computer-executable instructions for performing the step of:

entering a start time for said floating account.

29. The computer-readable medium of claim 21, having further computer-executable instructions for performing the step of:

entering a stop time for said floating account.

30. The computer-readable medium of claim 21, having further computer-executable instructions for performing the step of:

entering a departure time, wherein one or more electronic message received after the departure time is forwarded to said floating account.

31. The computer-readable medium of claim 30, having further computer-executable instructions for performing the step of:

storing one or more electronic message received after said departure time but before activation of said floating account.

32. The computer-readable medium of claim 21, wherein said floating account is a non-internet account.

33. The computer-readable medium of claim 32 wherein said non-internet account is a pager account.

34. The computer-readable medium of 32 wherein said non-internet account is a cellular telephone account.

35. The computer-readable medium of claim 32 wherein said non-internet account is a digital telephone account.

36. The computer-readable medium of claim 32 wherein said non-internet account is a satellite telephone account.

37. The computer-readable medium of 32 wherein said non-internet account is a voicemail account.

38. The computer-readable medium of claim 32 wherein said non-internet account is a facsimile account.

39. A computer-readable medium comprising computer-executable instructions for performing the following steps:

entering an associate service area in a database that corresponds to a request for service associated with a primary account;

receiving an electronic message addressed to the primary account;

looking up a floating account associated with said associate service area, wherein said floating account comprises a user identifier;

receiving a secondary account for said floating account from said associate service area; and replacing a recipient address of the electronic message with said secondary account.

40. The computer-readable medium of claim 39, having further computer-executable instructions for performing the step of:

entering a start time for said floating account.

41. The computer-readable medium of claim 39, having further computer-executable instructions for performing the step of:

entering a stop time for said floating account.

42. The computer-readable medium of claim 39, wherein said secondary account is a non-internet account.

43. The computer-readable medium of claim 39 wherein said non-internet account is a pager account.

44. The computer-readable medium of claim 39 wherein said non-internet account is a cellular telephone account.

45. The computer-readable medium of claim 39 wherein said non-internet account is a digital telephone account.

46. The computer-readable medium of claim 39 wherein said non-internet account is a satellite telephone account.

47. The computer-readable medium of claim 39 wherein said non-internet account is a voicemail account.

48. The computer-readable medium of claim 39 wherein said non-internet account is a facsimile account.

* * * * *

UNITED STATES PATENT AND TRADEMARK OFFICE
CERTIFICATE OF CORRECTION

PATENT NO. : 7,437,422 B2
APPLICATION NO. : 11/515481
DATED : October 14, 2008
INVENTOR(S) : Richard C. Fuisz It is certified that error appears in the above-identified patent and that said Letters Patent is hereby corrected as shown below:

Column 9
Line 32 , delete "form" and insert -- from -- therefor.

Column 11
Line 25 claim 34, delete "of 32" and insert -- of claim 32 -- therefor.
Line 31 claim 37, delete "of 32" and insert -- of claim 32 -- therefor.

Column 12
Line 23 claim 43, delete "claim 39" and insert -- claim 42 -- therefor.
Line 25 claim 44, delete "claim 39" and insert -- claim 42 -- therefor.
Line 27 claim 45, delete "claim 39" and insert -- claim 42 -- therefor.
Line 29 claim 46, delete "claim 39" and insert -- claim 42 -- therefor.
Line 31 claim 47, delete "claim 39" and insert -- claim 42 -- therefor.
Line 33 claim 48, delete "claim 39" and insert -- claim 42 -- therefor.

Signed and Sealed this

Thirty-first Day of March, 2009

JOHN DOLL
*Acting Director of the United States Patent and Trademark Office*